United States Patent
Kim et al.

(10) Patent No.: US 11,978,892 B2
(45) Date of Patent: May 7, 2024

(54) ELECTRODE ACTIVE MATERIAL COATING DEVICE AND METHOD FOR COATING ELECTRODE ACTIVE MATERIALS

(71) Applicant: LG CHEM, LTD., Seoul (KR)

(72) Inventors: Dana Kim, Daejeon (KR); Joo Hwan Sung, Daejeon (KR); Sanggu Ji, Daejeon (KR); Younjoong Kim, Daejeon (KR); Huigyun Nam, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 38 days.

(21) Appl. No.: 17/077,175

(22) Filed: Oct. 22, 2020

(65) Prior Publication Data

US 2021/0126252 A1    Apr. 29, 2021

(30) Foreign Application Priority Data

Oct. 23, 2019    (KR) .......................... 10-2019-0132484

(51) Int. Cl.
| | |
|---|---|
| B05C 5/02 | (2006.01) |
| B05C 11/02 | (2006.01) |
| B05C 11/10 | (2006.01) |
| H01M 4/36 | (2006.01) |

(52) U.S. Cl.
CPC .......... H01M 4/366 (2013.01); B05C 5/0254 (2013.01); B05C 11/028 (2013.01)

(58) Field of Classification Search
CPC .... H01M 4/366; H01M 4/139; H01M 4/0404; H01M 4/0409; B05C 9/12; B05C 5/0254; B05C 11/028; B05C 11/026; B05C 17/04; B05C 17/06; B05C 17/08; B05C 21/005; B05C 5/0258; B05C 11/1005; Y02E 60/10
USPC ................................................ 118/301, 504
See application file for complete search history.

(56) References Cited

U.S. PATENT DOCUMENTS

| | | | |
|---|---|---|---|
| 3,986,450 A * | 10/1976 | Zimmer ................ | B41F 35/004 |
| | | | 101/115 |
| 9,061,314 B2 | 6/2015 | Kim | |
| 9,713,814 B2 | 7/2017 | Huth et al. | |
| 2003/0035886 A1* | 2/2003 | Yamuni ................ | H05K 3/3485 |
| | | | 118/301 |

(Continued)

FOREIGN PATENT DOCUMENTS

| | | | |
|---|---|---|---|
| JP | 11126602 | * | 5/1999 |
| JP | 2007-66744 A | | 3/2007 |
| JP | 2009-28605 A | | 2/2009 |

(Continued)

OTHER PUBLICATIONS

English translation of JP11126602, published May 11, 1999, Nishi et al (Year: 1999).*

*Primary Examiner* — Yewebdar T Tadesse
(74) *Attorney, Agent, or Firm* — Birch, Stewart, Kolasch & Birch, LLP

(57) ABSTRACT

An electrode active material coating device according includes a transfer unit for continuously transferring a substrate in a first direction; a coating die for forming a coated portion by ejecting an electrode active material slurry on the substrate; and a guide unit including a guide portion that moves along the first direction between the coating die and the substrate.

12 Claims, 7 Drawing Sheets

(56) References Cited

U.S. PATENT DOCUMENTS

2011/0283903 A1* 11/2011 Hargreaves ......... B41F 15/0836
283/117
2012/0279632 A1* 11/2012 Lingier ................ B65C 9/1819
156/60

FOREIGN PATENT DOCUMENTS

| JP | 2014-79669 A | 5/2014 |
|----|---------------|--------|
| KR | 10-2011-0002935 A | 1/2011 |
| KR | 10-2012-0012725 A | 2/2012 |
| KR | 10-2015-0063484 A | 6/2015 |
| KR | 10-2017-0034222 A | 3/2017 |

* cited by examiner

[FIG. 1]
CONVENTIONAL ART
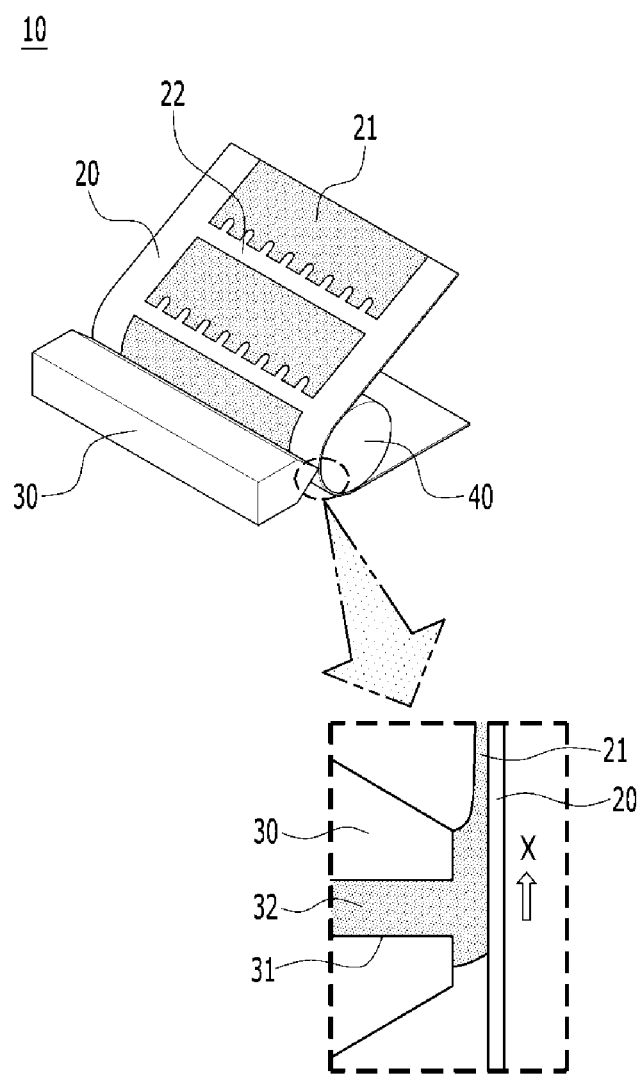

[FIG. 2]
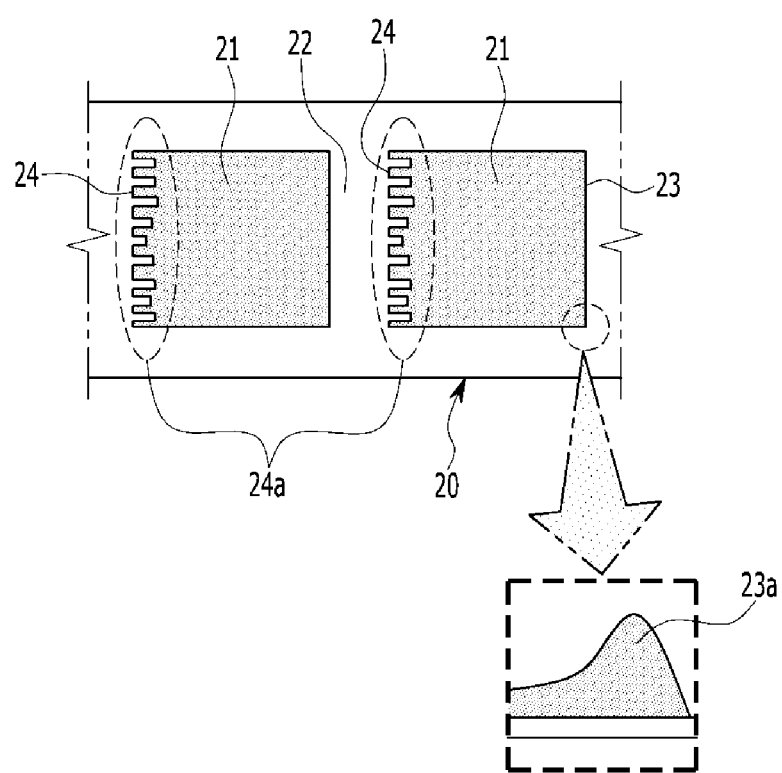

[FIG. 3]
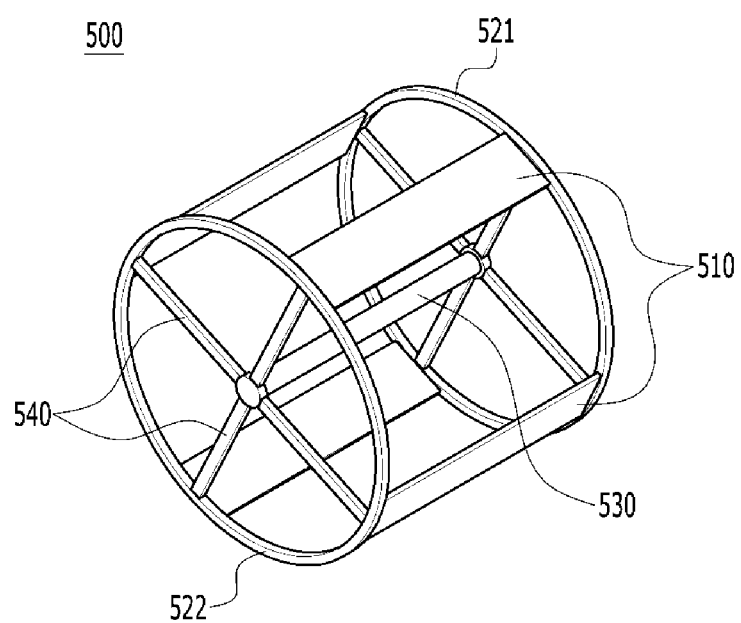

[FIG. 4]
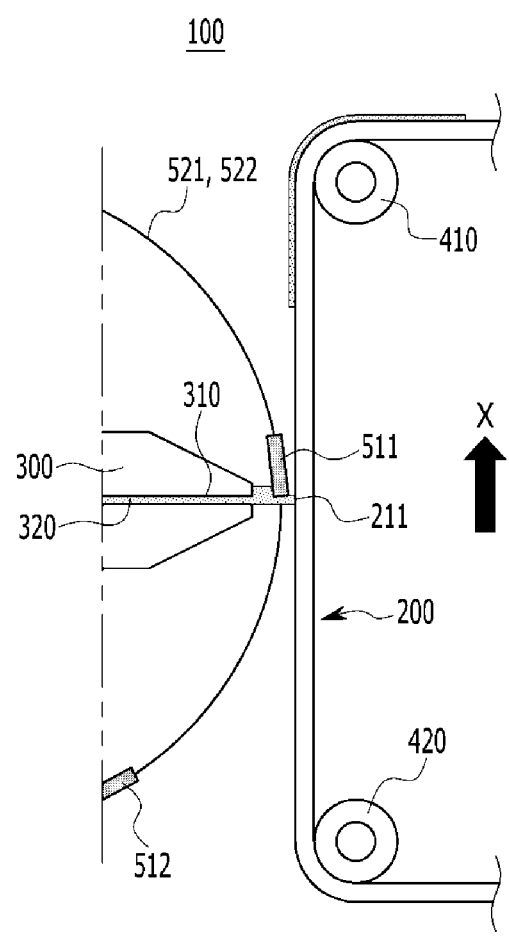

[FIG. 5]
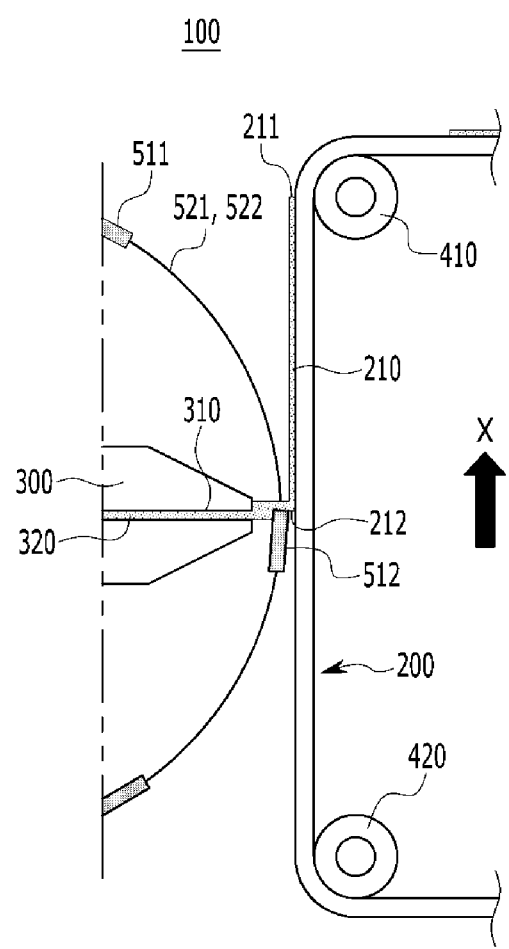

[FIG. 6]
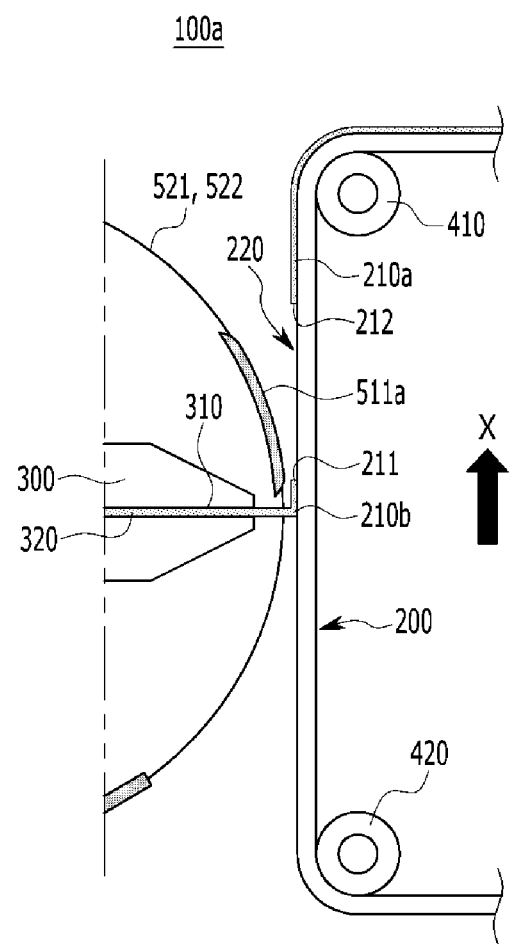

[FIG. 7]
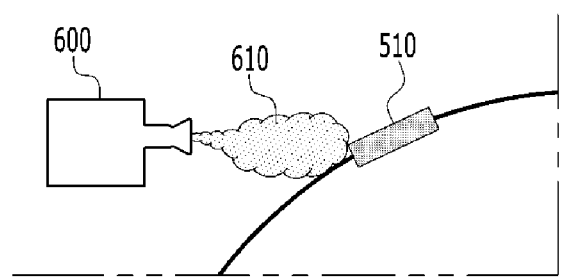

ELECTRODE ACTIVE MATERIAL COATING DEVICE AND METHOD FOR COATING ELECTRODE ACTIVE MATERIALS

TECHNICAL FIELD

The present disclosure relates to an electrode active material coating device and a method for coating an electrode active material, and more particularly to an electrode active material coating device that coats an electrode active material onto a substrate for an electrode current collector, and a method for coating the electrode active material.

BACKGROUND ART

Recently, there is an increasing interest in energy storage technology. For example, as applications of energy storage technology are expanded to mobile phones, camcorders, notebook PCs, and electric vehicles, efforts for research and development of energy storage technology are gradually materialized. Electrochemical devices are the most spotlighted field among the fields of energy storage technology, and interests are focused on the development of chargeable and dischargeable secondary batteries among the electrochemical devices. In particular, recently, in developing secondary batteries, research and development for design of novel electrodes and batteries are being carried out to improve capacity density and specific energy.

Since lithium secondary batteries among such secondary batteries have advantages of higher operation voltage and much greater energy density than conventional batteries using an aqueous solution (electrolyte), the lithium secondary batteries are widely used in various fields requiring energy storage technology.

A process of manufacturing a lithium secondary battery includes a process of forming an electrode active material layer on an electrode current collector. The process of forming the electrode active material layer includes coating active material slurry, in which electrode active material particles are dispersed in a binder solution, onto the electrode current collector, and drying the active material slurry coated on the electrode current collector to remove the solution and water present in the active material slurry, thereby forming the electrode active material layer on the electrode current collector.

FIG. 1 is a schematic diagram illustrating a conventional electrode active material coating device 10.

Referring to FIG. 1, a conventional electrode active material coating device 10 includes a roller 40 for continuously supplying a substrate 20 in a predetermined process direction (X direction) and a coating die 30 for ejecting the electrode active material slurry 32 through an ejection port 31.

The substrate 20 is a substrate for the electrode current collector, and the electrode current collector having the electrode active material layer formed thereon can be manufactured by drying the substrate 20 on which the electrode active material slurry 32 has been coated, to remove a solution and water present in the active material slurry.

In this case, the coating die 30 ejects the electrode active material slurry 32 such that a coated portion 21 on which the electrode active material slurry 32 has been coated and an uncoated portion 22 on which the electrode active material slurry 32 has not been coated are alternately positioned on the substrate 20.

FIG. 2 is a diagram showing a substrate 20 coated with an electrode active material slurry by the electrode active material coating device 10 of FIG. 1.

Referring to FIG. 2, the coated portions 21 and the uncoated portions 22 are alternately positioned on the substrate 20 as described in FIG. 1. In this case, a balcony region 23a, in which the electrode active material slurry is thickly formed on the substrate 20, can be formed at a start part 23 of the coated portion 21. Further, a drag line 24a of an irregular boundary line or the like can be formed at the end portion (24) of the coated portion 21.

In case of the balcony region 23a, it may cause a problem of a decrease in capacity due to uneven thickness and tapping of the battery.

In case of the drag line 24a, it may be disturbed when an electrode tab (not shown) is welded to the uncoated portion 22, and subsequently, may cause an internal short circuit during manufacture of a battery cell. In addition, when a length of the coated portion 21 is actually measured, subjective intervention may occur and interfere with consistent measurement, and an error may occur in recognizing the coated portion 21 in the manufacturing process.

It is possible to mitigate the occurrence of the balcony region 23a or the drag line 24a by adjusting physical properties or the like of the electrode active material slurry, but it is impossible to completely remove them.

Accordingly, there is a very high need for a technology capable of solving the above-mentioned problems.

DETAILED DESCRIPTION OF THE INVENTION

Technical Problem

Embodiments of the present disclosure have been proposed to solve the above problems of the prior art, and therefore, it is an object of the present disclosure to provide an electrode active material coating device and a method for coating an electrode active material that prevents the occurrence of a balcony region or a drag line in a continuous process of coating an electrode active material slurry.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

An electrode active material coating device according to an embodiment of the present disclosure comprises a transfer unit configured to continuously transfer a substrate in a first direction; a coating die configured to form a coated portion by ejecting an electrode active material slurry on the substrate; and a guide unit including a guide portion that moves along the first direction between the coating die and the substrate.

The guide portion may include a first guide portion that moves in correspondence with a start part of the coated portion and a second guide portion that moves in correspondence with an end part of the coated portion.

The coated portion may include a first coated part and a second coated part spaced apart from each other, with an uncoated portion being interposed therebetween, and the guide portion may include a wide guide portion that moves in correspondence with the end part of the first coated part and the start part of the second coated part.

The guide portion may include a film that does not absorb the electrode active material slurry.

The film may include at least one selected among polyimide (PI), polypropylene (PP), polysulfone (PSF), polyethylene (PE), a copper (Cu), and an aluminum (Al).

After the guide portion has passed between the coating die and the substrate, the guide portion may move between the coating die and the substrate again.

The guide unit may include a first circular frame connected to a first end of the guide portion, a second circular frame connected to a second end of the guide portion, and a central axis connecting a central part of the first circular frame and a central part of the second circular frame.

The guide portion may be provided in plurality and at least one of the guide portions of the plurality of guide portions may be in a plate shape having a same curvature as that of the first circular frame and the second circular frame.

A thickness of the guide portion may be less than a distance between the coating die and the substrate.

The electrode active material coating device may further include a cleaning unit configured to clean the guide portion after the guide portion has passed between the coating die and the substrate.

A method for coating electrode active materials according to an embodiment of the present disclosure includes a transfer step of continuously transferring a substrate in a first direction; and a coating step of ejecting an electrode active material slurry on the substrate with a coating die to form a coated portion on the substrate, wherein the coating step includes moving a guide portion between the coating die and the substrate.

The guide portion may include a first guide portion that moves in correspondence with a start part of the coated portion and a second guide portion that moves in correspondence with an end part of the coated portion.

The coated portion may include a first coated part and a second coated part spaced apart from each other, with an uncoated portion being interposed therebetween, and the guide portion may include a wide guide portion that moves in correspondence with an end part of the first coated part and a start part of the second coated part.

As the substrate is continuously transferred in the first direction, the guide portion that has passed between the coating die and the substrate may move between the coating die and the substrate again.

The method for coating electrode active materials may further include a cleaning step of cleaning the guide portion after the guide portion has passed between the coating die and the substrate.

Advantageous Effects

According to the embodiments of the present disclosure, it is possible to prevent a balcony region or a drag line from occurring on a coated portion onto which an electrode active material is coated, through a guide portion moving together with a substrate.

BRIEF DESCRIPTION OF THE DRAWINGS

FIG. 1 is a schematic diagram showing a conventional electrode active material coating device.

FIG. 2 is a diagram showing a substrate coated with an electrode active material slurry by the electrode active material coating device 10 of FIG. 1.

FIG. 3 is a perspective view of a guide unit that is used in an electrode active material coating device according to an embodiment of the present disclosure.

FIG. 4 is a partial view showing an electrode active material coating device according to an embodiment of the present disclosure.

FIG. 5 is a partial view showing a state after a certain period of time has lapsed for the electrode active material coating device of FIG. 4.

FIG. 6 is a partial view showing an electrode active material coating device having a wide guide portion.

FIG. 7 is a partial view showing a cleaning unit.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 3 is a perspective view of a guide unit 500 used in an electrode active material coating device according to an embodiment of the present disclosure, and FIG. 4 is a partial view showing an electrode active material coating device 100 according to an embodiment of the present disclosure. In particular, FIG. 4 shows a state in which the guide unit 500 of FIG. 3 is employed.

Referring to FIGS. 3 and 4, the electrode active material coating device 100 according to an embodiment of the present disclosure includes a transfer unit for continuously transferring a substrate 200 in a first direction (X direction); a coating die 300 for ejecting an electrode active material slurry 320 on the substrate 200; and a guide unit 500 including a guide portion 510 that moves toward the first direction (X direction) between the coating die 300 and the substrate 200.

First, the guide unit 500 may include a guide portion 510, a first circular frame 521 connected to one end of the guide portion 510, a second circular frame 522 connected to the other end of the guide portion 510, and a central axle 530 connecting a central part of the first circular frame 521 and a central part of the second circular frame 522. Further, the first circular frame 521 and the second circular frame 522 may include a bar frame 540 connected to the respective central parts. For example, the bar frame may include a first bar frame on the first circular frame 521 that is connected to diametrically opposed points on the first circular frame 521 and a first bar frame on the second circular frame 522 connected to diametrically opposed points on the second circular frame 522.

The guide portion 510 is for preventing the occurrence of a balcony region or a drag line when the electrode active material slurry 320 is coated, and may move along a circumferential direction as the first circular frame 521 and the second circular frame 522 rotates around the central axle 530.

That is, the guide portion 510 may move along the first direction (X direction) between the coating die 300 and the substrate 200, and may move along the circumferential direction of the first circular frame 521 and the second circular frame 522, rather than the first direction (X direction), as it is spaced apart from the coating die 300.

For this purpose, although not concretely shown, the central axle 530 and the coating die 300 are preferably positioned on the same plane relative to a plane perpendicular to the first direction (X direction).

The substrate 200 is a substrate for an electrode current collector, and may include an aluminum, a copper, a stainless steel, a nickel, a titanium, or a calcined carbon, or stainless steel treated with carbon, nickel, titanium, silver, or the like on the surface thereof.

The transfer unit is for continuously transferring the substrate 200 in the first direction (X direction), and may include a first roller 410 and a second roller 420. As such, the transfer unit may continuously transfer the substrate 200 in a first direction in a plane extending between the first roller 410 and the second roller 420.

The coating die 300 may include an ejection port 310 for ejecting the electrode active material slurry 320.

Hereinafter, a method for coating electrode active materials using the electrode active material coating device 100 that includes the guide portion 510 will be described.

FIG. 5 is a partial view showing a state after a certain period of time has lapsed for the electrode active material coating device 100 of FIG. 4.

Referring to FIGS. 3-5 together, the guide portion 511 and 512 may include a first guide portion 511 that moves in correspondence with a start part 211 of a coated portion 210 and a second guide portion 512 that moves in correspondence with an end part 212 of the coated portion 210. The first guide portion 511 extends between a first point on the first circular frame 521 and a first point on the second circular frame 522. The second guide portion 512 extends between a second point on the first circular frame 521 and a second point on the second circular frame 522. The first bar frame on the first circular frame 521 extends between the first point on the first circular frame 521 and the second point on the first circular frame 521. Similarly, the first bar frame on the second circular frame 522 extends between the first point on the second circular frame 522 and the second point on the second circular frame 522.

The coated portion 210 refers to a region in which the electrode active material slurry 320 is coated onto the substrate 200, the start part 211 refers to a side where the coated portion 210 starts to be formed, and the end part 212 refers to a side where the coated portion 210 is terminated.

As shown in FIG. 4, when the electrode active material slurry 320 starts to be ejected from an ejection port 310, the first guide portion 511 passes between the ejection port 310 and the substrate 200.

After the first guide portion 511 has passed through, the electrode active material slurry 320 starts to be coated onto the substrate 200 to form the start part 211.

Accordingly, the balcony region that could occur in a conventional method for coating electrode active materials may not be created in the present embodiment.

Next, as shown in FIG. 5, when the ejection of the electrode active material slurry 320 is finished, the second guide portion 512 passes between the ejection port 310 and the substrate 200.

From the moment the second guide portion 512 has passed through, the application of the electrode active material slurry 320 on the substrate 200 is stopped, and the end part 212 is formed.

Thereby, the drag line that may have occurred in the conventional method for coating electrode active materials may not be created in the present embodiment.

In this case, a moving speed of the first guide portion 511 and the second guide portion 512 may match with a speed of the substrate 200 that moves along the first direction (X direction).

Further, the first guide portion 511 and the second guide portion 512 may be composed of a plurality, respectively, and after the first guide portion 511 and the second guide portion 512 has passed between the coating die 300 and the substrate 200, they may move between the coating die 300 and the substrate 200 again. That is, along with the rotation of first and second circular frames 521 and 522 in a circumferential direction, the first guide portion 511 and the second guide portion 512 can repeatedly move between the coating die 300 and the substrate 200. Because the first guide portion 511 and the second guide portion may be provided in plurality, a first opening may be provided between the first guide portion 511 and the second guide portion 512 and a second opening may be provided between the first guide portion 511 and a third guide portion (in this case another guide portion 512). In fact, the third guide portion may extend between a third point on the first circular frame 521 and a third point on the second circular frame 522 and a fourth guide portion (another guide portion 511) may extend between a fourth point on the first circular frame 521 and a fourth point on the second circular frame 522. In addition, a second bar frame on the first circular frame 521 may extend between the third point on the first circular frame 521 and the fourth point on the first circular frame 521 and a second bar frame on the second circular frame 522 may extend between the third point on the second circular frame 522 and the fourth point on the second circular frame 522. As such, the first bar frame and second bar frame of each of the first circular frame 521 and second circular frame 522 may cross each other at a center point of the first circular frame 521 and the second circular frame 522, respectively. The central axle 530 may connect to the bar frames at the central point of the first circular frame 521 and second circular frame 522.

Along the substrate 200 that continuously moves in the first direction (X direction), the plurality of first guide portions 511 and second guide portions 512 may continuously passes between the coating die 300 and the substrate 200 to mass-produce the coated portions 210 spaced apart at regular intervals. The guide portions 511 and 512 in this embodiment have a structure that can be easily applied to an automation process.

Further, a thickness of the guide portion 511 and 512 is preferably thinner than a distance between the coating die 300 and the substrate 200 so that the guide portion 511 and 512 can pass smoothly between the coating die 300 and the substrate 200. Herein, the thickness of the guide portion 511 and 512 means a length in a direction perpendicular to a movement direction of the guide portion 511 and 512.

On the other hand, the guide portion 510 including the first guide portion 511 and the second guide portion 510 may be in a plate shape, and may include a film that does not absorb the electrode active material slurry 320. Such a film that does not absorb the electrode active material slurry 320 may include at least one selected among polyimide (PI), polypropylene (PP), polysulfone (PSF), polyethylene (PE), a copper (Cu) and an aluminum (Al).

FIG. 6 is a partial view showing an electrode active material coating device 100a having a wide guide portion 511a.

Referring to FIG. 6, for the wide guide portion 511a to form, on the substrate 200, the first coated part 210a and the second coated part 210b spaced apart from each other, with an uncoated portion 220 being interposed therebetween, the electrode active material coating device 100a of this embodiment may include a wide guide portion 511a that moves in correspondence with an end part 212 of a first coated part 210a and a start part 211 of a second coated part 210b.

From the moment the upper end of the wide guide portion 511a has passed between the coating die 300 and the substrate 200, the coating of the electrode active material slurry 320 onto the substrate 200 is stopped, and the end part 212 of the first coated part 210a is formed.

Further, after the lower end of the wide guide portion 511a has passed between the coating die 300 and the substrate 200, the electrode active material slurry 320 starts to be coated onto the substrate 200 again to form the start part 211 of the second coated part 210b.

Through this wide guide portion 511a, it is possible to prevent the occurrence of the drag line and the balcony region at the end part 212 of the first coated part 210a and the start part 211 of the second coated part 210b, respectively.

The wide guide portion 511a may include a film that does not absorb the electrode active material slurry 320, similarly to the first and second guide portions 511 and 512.

Further, the wide guide portion 511a may have a plate shape, but may be in the form of a plate, a height of which is extended in correspondence with the end part 212 of the first coated part 210a and the start part 211 of the second coated part 210b.

Meanwhile, at least one of the guide portions 511, 512 and 511a according to the present embodiment may be in a plate shape having the same curvature as that of the first and second circular frames 521 and 522. In particular, the wide guide portion 511a may be in a plate shape having the same curvature as that of the first and second circular frames 521 and 522 as in FIG. 6 so that the wide guide portion 511a can smoothly pass between the coating die 300 and the substrate 200 as it extends in height.

FIG. 7 is a partial view showing a cleaning unit 600.

Referring to FIG. 7, the electrode active material coating device according to the present embodiment may further comprise a cleaning unit 600 for cleaning the guide portion 510 that has passed between the coating die and the substrate.

Specifically, before the guide portions 510 that have passed between the coating die 300 and the substrate 200 in FIGS. 4 to 6 pass between the coating die 300 and the substrate 200 again, they can be cleaned by the cleaning unit 600.

The cleaning unit 600 can perform the cleaning by spraying a cleaning material 610 on the guide portion 510 that has passed between the coating die and the substrate.

Such a cleaning material 610 may include a cleaning solution or an air pressure.

Hereinafter, a method for coating an electrode active material will be described according to an embodiment of the present disclosure. Specifically, with respect to the method for coating electrode active materials according to the present disclosure, the contents overlapping with those described above will be omitted.

Referring back to FIGS. 4 and 5, the method for coating electrode active materials according to an embodiment of the present disclosure includes a transfer step of continuously transferring a substrate 200 in a first direction (X direction); and a coating step of forming a coated portion 210 on the substrate by ejecting an electrode active material slurry 320 on the substrate 200 with a coating die 300, wherein the coating step includes moving a guide portion 511 and 512 between the coating die 300 and the substrate 200.

The guide portion 511 and 512 may include a first guide portion 511 that moves in correspondence with a start part 211 of the coated portion 210 and a second guide portion 512 that moves in correspondence with an end part 212 of the coated portion 210.

In the coating step, the electrode active material slurry 320 starts to be coated onto the substrate 200 after the first guide portion 511 has passed through, to form the start part 211, thereby preventing a balcony region from occurring in the start part 211.

Further, in the coating step, the coating of the electrode active material slurry 320 on the substrate 200 is stopped from the moment the second guide portion 512 has passed through, and the end part 212 can be formed, thereby preventing a drag line from occurring in the end part 212.

In the transfer step, as the substrate 200 is continuously transferred in the first direction (X direction), the guide portions 511 and 512 that have passed between the coating die 300 and the substrate 200 may be transferred to the coating die 300 and the substrate 200 again.

As such, the guide portions 511 and 512 continuously pass between the coating die 300 and the substrate 200 to enable an automation process of continuously mass-producing the coated portions spaced apart from each other at predetermined intervals.

Detailed descriptions are omitted as they are redundant with the previous ones.

Meanwhile, referring back to FIG. 6, a first coated part 210a and a second coated part 210b spaced apart from each other, with an uncoated portion 220 being interposed therebetween, may be formed on the substrate 200.

The guide portion may include a wide guide portion 511a that moves in correspondence with the end part 212 of the first coated part 210a and the start part 211 of the second coated part 210b.

In the coating step, from the moment the upper end of the wide guide portion 511a has passed between the coating die 300 and the substrate 200, the coating of the electrode active material slurry 320 onto the substrate 200 is stopped, and the end part 212 of the first coated part 210a is formed.

Further, after the lower end of the wide guide portion 511a has passed between the coating die 300 and the substrate 200, the electrode active material slurry 320 starts to be coated onto the substrate 200 again, and the start part 211 of the second coated part 210b is formed. Accordingly, it is possible to prevent the occurrence of the drag line and the balcony region at the end part 212 of the first coated part 210a and the start part 211 of the second coated part 210b, respectively.

Likewise, the detailed description is omitted because it is redundant with the previous one.

Meanwhile, referring back to FIG. 7, the method for coating electrode active materials according to the present embodiment may further include a cleaning step of cleaning the guide portion 510 that has passed between the coating die and the substrate.

Specifically, the cleaning step may include cleaning the guide portion 510 by spraying a cleaning material 610 on the guide portion 510 that has passed between the coating die and the substrate with a cleaning unit 600.

Meanwhile, the electrode active material may include a positive electrode active material or a negative electrode active material depending on a type of the electrode that is manufactured.

The positive electrode active material may be a layered compound such as lithium cobalt oxide ($LiCoO_2$) or lithium nickel oxide ($LiNiO_2$) or a compound substituted with one or more transition metals; lithium manganese oxides such as chemical formulae $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi1-xMxO_2$ (where, M=Co, Mn, Al, Cu, Fe, Mg, B or Ga, and x=0.01~0.3); lithium manganese composite oxide represented by chemical formulae $LiMn_2-xMxO2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO4)_3$, and the like, but is not limited thereto.

An example of the negative electrode active material may include carbons such as hardly graphitizable carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, 3 elements in the periodic table, halogen; $0<x \leq 1$; $1 \leq y \leq 3$; $1 \leq z \leq 8$); lithium alloys; silicon-based alloys; tin-based alloys; metal-based oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; a conductive polymer such as polyacetylene; Li—Co—Ni based materials and the like.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: electrode active material coating device
200: substrate
300: coating die
410: first roller
420: second roller
500: guide unit
510: guide portion
511: first guide portion
512: second guide portion
511a: wide guide portion
600: cleaning unit

The invention claimed is:

1. An electrode active material coating device comprising:
   a transfer unit configured to continuously transfer a substrate in a first direction;
   a coating die configured to form a coated portion by ejecting an electrode active material slurry on the substrate; and
   a guide unit including a guide portion that moves along the first direction when between the coating die and the substrate,
   wherein the guide portion includes a first guide portion that moves in correspondence with a start part of the coated portion and a second guide portion that moves in correspondence with an end part of the coated portion,
   wherein the first guide portion and the second guide portion block the electrode active material slurry from being coated on the substrate, and
   wherein the guide unit includes:
      a first circular frame connected to a first end of the guide portion, a second circular frame connected to a second end of the guide portion;
      wherein the first guide portion extends between a first point on the first circular frame and a first point on the second circular frame;
      wherein the second guide portion extends between a second point on the first circular frame and a second point on the second circular frame;
      a first bar frame on the first circular frame connected to diametrically opposed points on the first circular frame;
      a first bar frame on the second circular frame connected to diametrically opposed points on the second circular frame; and
      a central axle connecting a central part of the first circular frame and a central part of the second circular frame.

2. The electrode active material coating device according to claim 1,
   wherein the coated portion includes a first coated part and a second coated part spaced apart from each other, with an uncoated portion being interposed therebetween, and
   wherein the guide portion includes a wider guide portion that moves in correspondence with an end part of the first coated part and a start part of the second coated part.

3. The electrode active material coating device according to claim 1,
   wherein the guide portion includes a film that does not absorb the electrode active material slurry.

4. The electrode active material coating device according to claim 3,
   wherein the film includes at least one selected among polyimide (PI), polypropylene (PP), polysulfone (PSP), polyethylene (PE), a copper (Cu), and an aluminum (Al).

5. The electrode active material coating device according to claim 1,
wherein the guide portion is provided in plurality,
wherein at least one of the guide portions of the plurality of guide portions is in a plate shape having a same curvature as that of the first circular frame and the second circular frame.

6. The electrode active material coating device according to claim 1,
wherein a thickness of the guide portion is less than a distance between the coating die and the substrate.

7. The electrode active material coating device according to claim 1,
further comprising a cleaning unit configured to clean the guide portion after the guide portion has passed between the coating die and the substrate.

8. The electrode active material coating device according to claim 1, wherein the guide portion has a leading edge formed at a first opening in the guide unit and a trailing edge formed at a second opening in the guide unit.

9. The electrode active material coating device according to claim 8, wherein the guide portion is provided in plurality, and
wherein the first opening is between the first guide portion and the second guide portion and the second opening is between the first guide portion and a third guide portion.

10. The electrode active material coating device according to claim 1, wherein the transfer unit is configured to continuously transfer the substrate in the first direction in a plane extending between two spaced rollers.

11. The electrode active material coating device according to claim 1, wherein the first bar frame on the first circular frame extends between the first point on the first circular frame and the second point on the first circular frame, and
wherein the first bar frame on the second circular frame extends between the first point on the second circular frame and the second point on the second circular frame.

12. The electrode active material coating device according to claim 1, wherein the guide unit further comprises:
a third guide portion extending between a third point on the first circular frame and a third point on the second circular frame;
a fourth guide portion extending between a fourth point on the first circular frame and a fourth point on the second circular frame;
a second bar frame on the first circular frame extending between the third point on the first circular frame and the fourth point on the first circular frame; and
a second bar frame on the second circular frame extending between the third point on the second circular frame and the fourth point on the second circular frame,
wherein the first bar frame and second bar frame of each of the first circular frame and second circular frame cross each other at a center point of the first circular frame and second circular frame, respectively, and
wherein the central axle connects to the bar frames at the central point of the first circular frame and second circular frame.

* * * * *